(12) United States Patent
Mueller et al.

(10) Patent No.: US 10,867,464 B2
(45) Date of Patent: Dec. 15, 2020

(54) APPARATUS FOR HANDLING STACKS FOR ARTICLES

(71) Applicant: Robert Bosch GmbH, Stuttgart (DE)

(72) Inventors: Martin J. Mueller, Palm Harbor, FL (US); Ryan Dye, Lutz, FL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/955,405

(22) Filed: Apr. 17, 2018

(65) Prior Publication Data
US 2019/0315504 A1 Oct. 17, 2019

(51) Int. Cl.
*B65G 47/82* (2006.01)
*G07F 11/58* (2006.01)
*B65B 35/24* (2006.01)
*B65B 35/44* (2006.01)

(52) U.S. Cl.
CPC .......... *G07F 11/58* (2013.01); *B65B 35/246* (2013.01); *B65B 35/44* (2013.01); *B65G 47/82* (2013.01)

(58) Field of Classification Search
CPC ...... B65B 43/44; H05K 13/021; B65G 57/24; B65G 57/06; B65G 57/11; B65G 47/295; B65G 47/8823; B65G 47/29; B65H 29/36; B65H 2404/254; B65H 2405/322; B65H 2404/2571; B65H 2301/422615; B65H 31/3018; B65H 29/34; G07F 11/24; G07F 11/16; Y10T 156/178
See application file for complete search history.

(56) References Cited

U.S. PATENT DOCUMENTS

| | | | | | |
|---|---|---|---|---|---|
| 2,262,799 | A * | 11/1941 | Everett | ................. | B65G 47/82 198/419.1 |
| 2,370,848 | A * | 3/1945 | Doggett | ................. | B65G 59/10 221/106 |
| 2,869,754 | A * | 1/1959 | Booth | ................. | G07F 13/10 221/106 |
| 2,946,480 | A * | 7/1960 | Farber | ................. | B65G 59/101 221/106 |
| 2,960,243 | A * | 11/1960 | Beaulieu | ................. | B65H 29/34 271/218 |
| 3,413,911 | A * | 12/1968 | Phelan | ................. | A21B 2/00 126/41 R |
| 3,550,749 | A * | 12/1970 | Story | ................. | B65G 47/086 198/431 |
| 3,688,946 | A * | 9/1972 | Graham | ................. | B65G 47/00 221/11 |
| 4,367,999 | A * | 1/1983 | Benuzzi | ................. | B27B 31/08 271/189 |

(Continued)

*Primary Examiner* — Gregory W Adams
(74) *Attorney, Agent, or Firm* — Wood, Phillips, Katz, Clark & Mortimer

(57) ABSTRACT

An apparatus for handling stacks of articles, such as cups or containers, includes a selectively extensible conveyor which can be indexed for moving the stacks of articles, and which can moved from an extended position to a retracted position. By movement from the extended position, the conveyor is moved from beneath one or more of the stacks for discharging stacks from the apparatus. The apparatus includes one or more movable stack gates for controlling, guiding, and stabilizing movement and discharge of the stacks, to thereby avoid problems associated with the instability of the stacked articles.

12 Claims, 18 Drawing Sheets

(56) References Cited

U.S. PATENT DOCUMENTS

| | | | | | |
|---|---|---|---|---|---|
| 4,439,101 | A | * | 3/1984 | Orlowski | B65G 59/101 221/11 |
| 5,018,338 | A | * | 5/1991 | Jurchuk | B65B 5/068 53/251 |
| 5,096,371 | A | * | 3/1992 | Mojden | B65H 31/3045 221/11 |
| 5,207,311 | A | * | 5/1993 | Terai | B65G 47/74 198/419.1 |
| 5,799,823 | A | * | 9/1998 | Feltrin | G07F 11/08 221/242 |
| 5,961,274 | A | * | 10/1999 | Bors | B65G 57/06 414/789.6 |
| 6,968,937 | B2 | * | 11/2005 | Mader | B65H 29/003 198/419.1 |
| 7,648,664 | B2 | * | 1/2010 | Teal | B33Y 30/00 264/308 |
| 7,788,885 | B2 | * | 9/2010 | Sandberg | B65B 5/106 53/473 |
| 7,874,246 | B2 | * | 1/2011 | Pryor | A21C 9/085 99/537 |
| 8,087,541 | B2 | * | 1/2012 | Valota | G07F 11/58 221/175 |
| 8,789,681 | B2 | * | 7/2014 | Silberbauer | B42C 19/08 198/426 |
| 9,394,133 | B2 | * | 7/2016 | Knoefel | B65H 29/38 |
| 2014/0367403 | A1 | * | 12/2014 | Carpentier | G07F 11/005 221/12 |

* cited by examiner

STEP 1:
TOP VIEW

STEP 1:
SIDE VIEW

STEP 2:
TOP VIEW

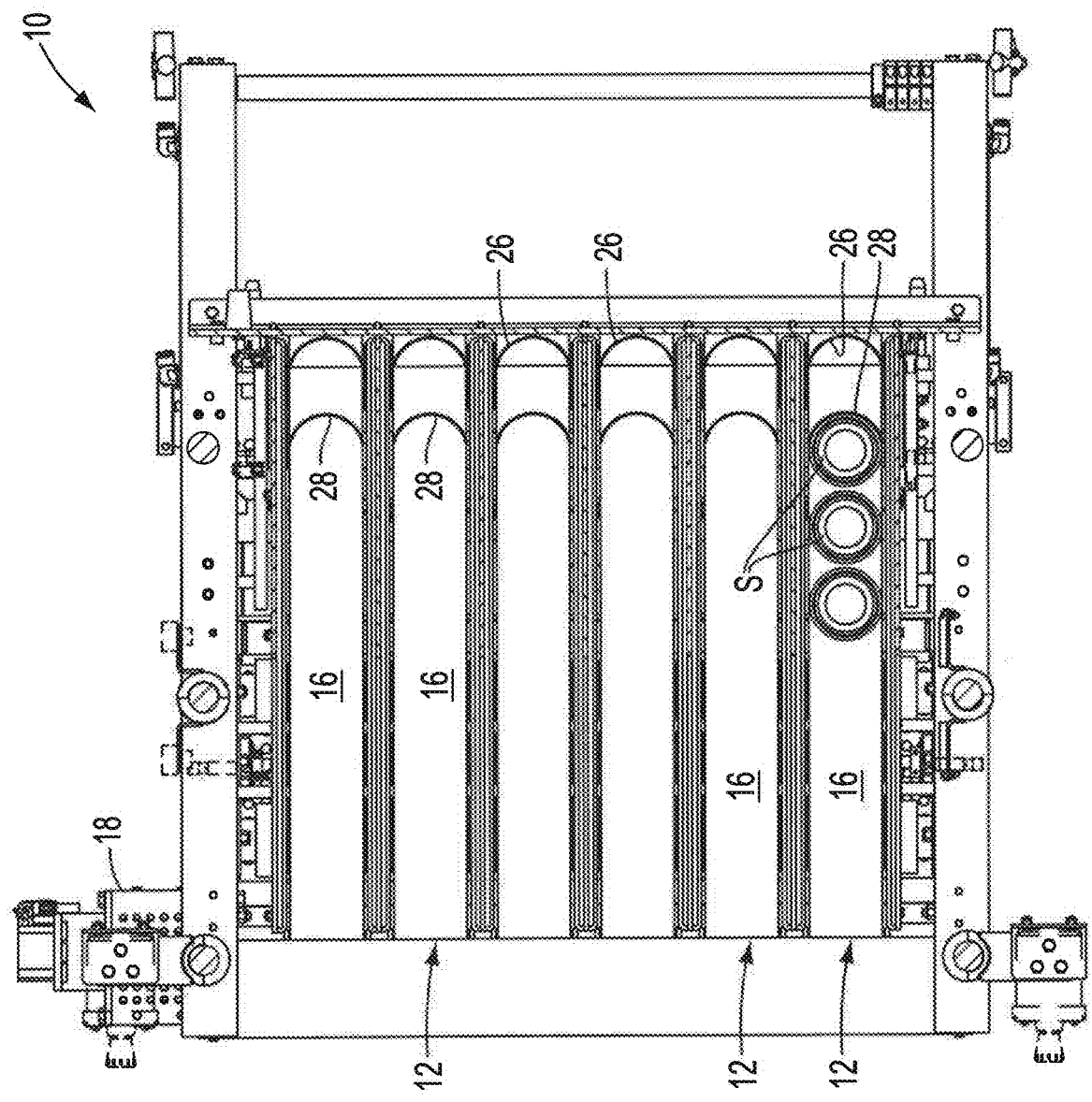

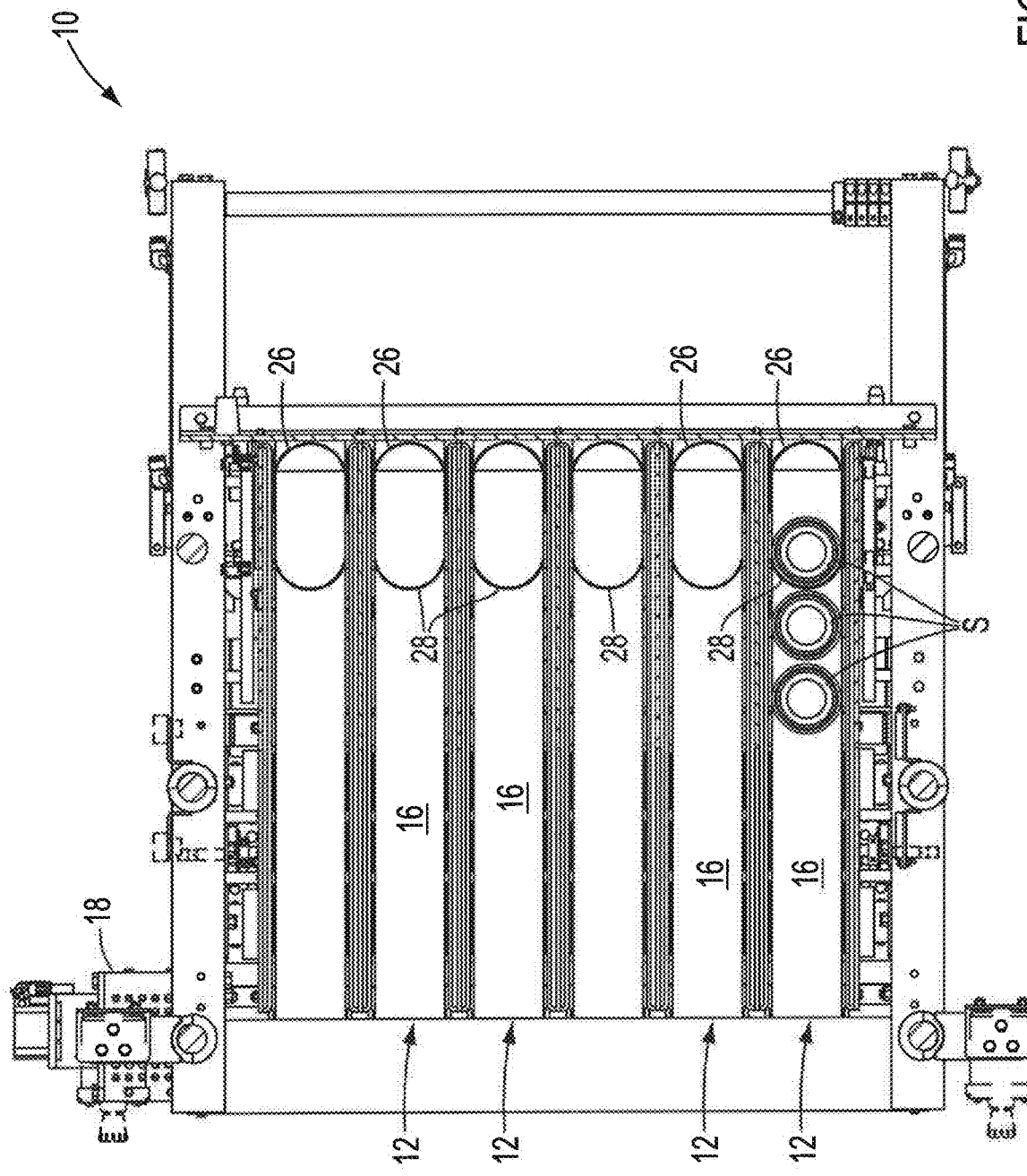

STEP 5: TOP VIEW

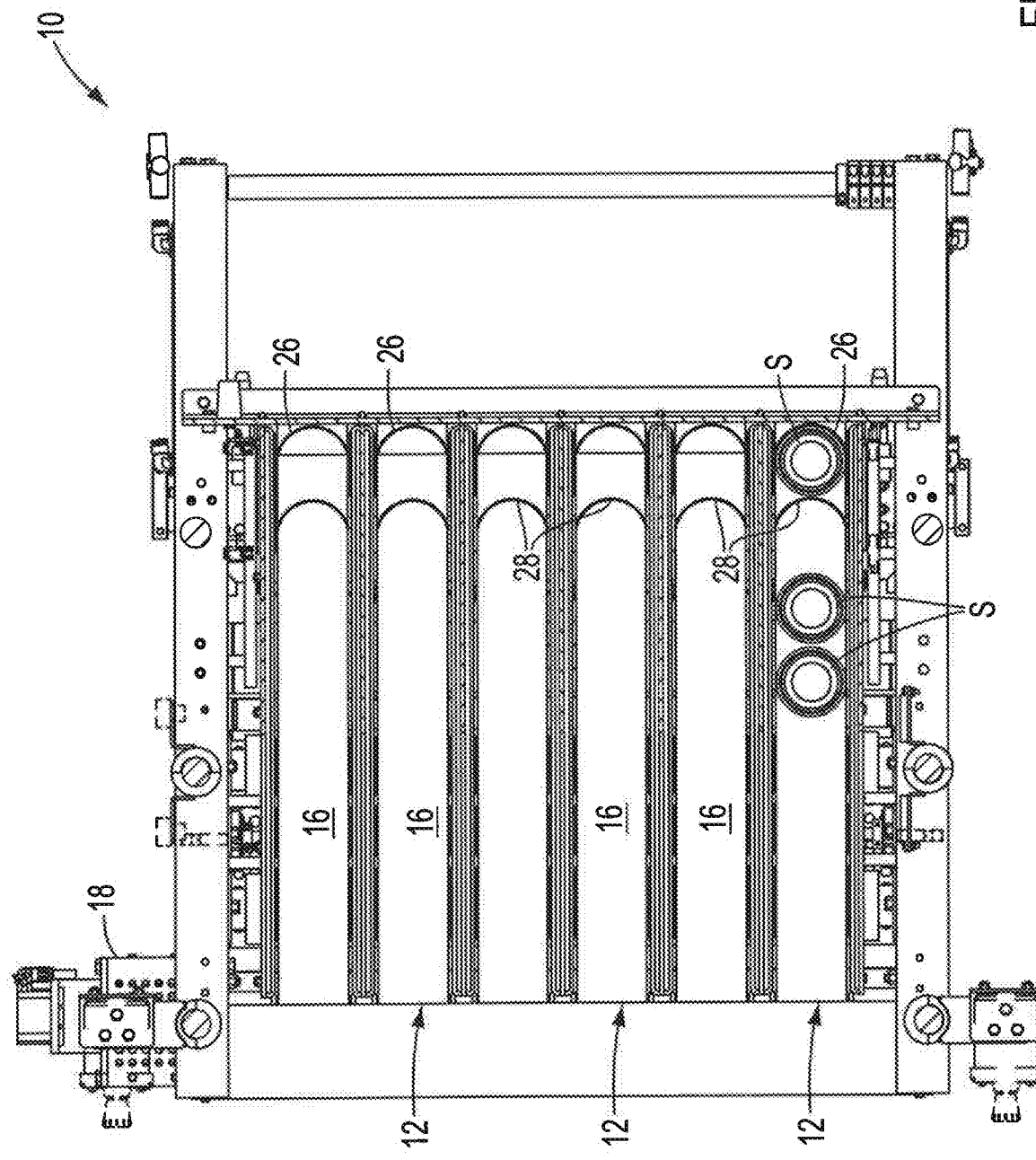

STEP 6:
SIDE VIEW

STEP 7: TOP VIEW

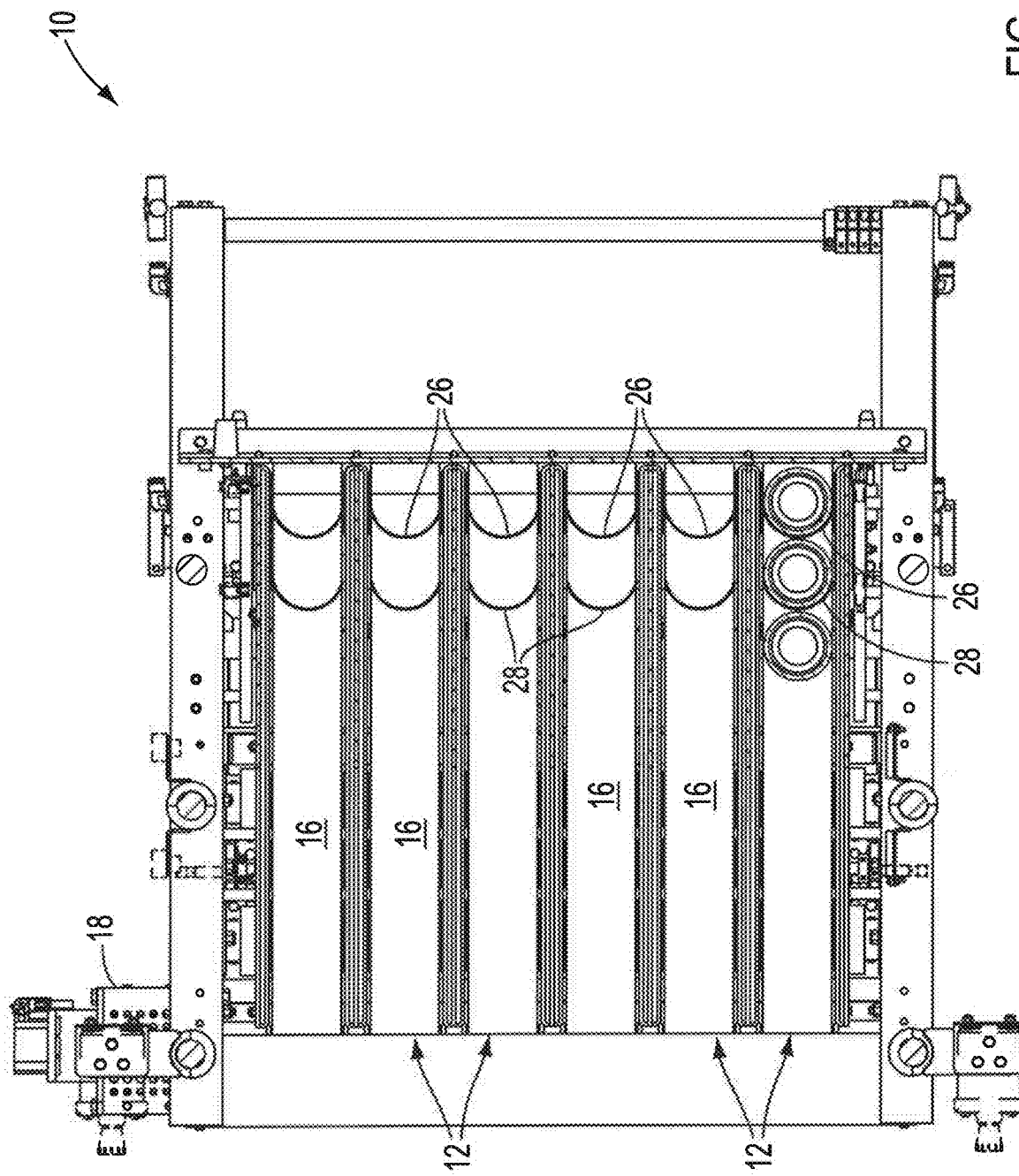

APPARATUS FOR HANDLING STACKS FOR ARTICLES

TECHNICAL FIELD

The present invention relates generally to an apparatus for handling stacks of articles, such as cups or containers, for subsequently filling, and more particularly to an apparatus for handling stacks of articles which includes a conveyor which can be moved from an extended position to a retracted position for discharging stacks therefrom, with one or more movable stack gates provided for controlling and guiding movement and discharge of the stacks.

BACKGROUND OF THE INVENTION

In connection with a typical process for filling cups or containers with food products or the like, it is necessary to supply stacks of the containers to the filling equipment for subsequent filling of the individual containers. A typical container stack handling unit is sometimes referred to as a cup loader, and is basically a conveyorized reserve or accumulator for the stacks.

In typical operation, an operator ordinarily loads stacks of cups out of shipping boxes, which may be fifty cups high, with five to ten stacks positioned deep into slots in the cup loader machine. There is usually one slot for each lane on the machine, with a stack conveyor provided which functions to index the stacks forward on demand into a drop position, where they drop and load into the associated denester mechanism. Normally, the denester mechanism consists of scrolls or jaws to separate each cup from the stack, and to insert or drop the cup into the filling machine conveyor. The operation is such that the operator has "lag time" do other things for a few minutes until they need to load the cup loader again.

Experience has shown that in some instances, operation of the typical cup loader apparatus can be problematic. For the most part, when the containers are stable, the unit performs consistently. The main difficulty arises with instability of some containers, and due to instability of the stack as machine transfers stacks from the stack conveyor into the "drop zone". The "drop zone" is the position where the stacks fall into the associated denesting mechanism.

Normally, the stack conveyors turn on and off, indexing the stacks forward into the drop position. There are also arrangements which are known that include a walking beam mechanism that moves the stacks forward into the drop position. Some arrangements slide the stacks off of the edge of the conveyor, while others slide the stacks from the conveyor onto a trap door mechanisms that pulls out from beneath the stack to let the stack fall downwardly.

All of these various arrangements can have problems of one type or another, especially when the containers are unstable. Normally, if the stacks are unstable they can lean and wave, and potentially drop in the wrong direction, or get "hung up" or interfere with something, during those moments where the stacks are not controlled. This is especially the case in arrangement which includes the drop-off-the-edge type of release. With the typical trap door mechanism, there is more control, but at times the containers can resist movement onto the trap door, or do not seat completely to the front of the mechanism. All potential issues are amplified by a typical arrangement including multiple lanes. Any of these malfunctions can cause a jam in the cup loader machine, and the require the operator to enter the area and dislodge the jam.

The present stack handling apparatus and method of operation desirably act to minimize jamming or other disruption in the cup loader apparatus by controlling and stabilizing the stacks of containers as they are indexed in the apparatus and are dispensed to the associated denesting mechanism.

SUMMARY OF THE INVENTION

The present invention addresses problems associated with cup loader and like machines for handling stacks of articles such as cups or containers. This is accomplished by providing an elongating, extendible and retractable conveyor, which extends and moves each stack forwardly smoothly, and presents each stack to a front or endmost position. A semi-cylindrical, half-round gate is provided that rotates around the stack, holding it completely in the drop position prior to to the elongating conveyor retracting to its original position. The conveyor thus moves from beneath one or more of the endmost stacks. In this way, dropping or sliding each stack, or otherwise creating additional friction, is avoided, since this can undesirably disturb the stack and cause it to swing the wrong way or otherwise become unstable. The present apparatus is arranged such that there is always a stack pressing from the back side to keep each in position, with the stack gate provided on the front side of the stack, except during that brief moment when that stack is moved to the front position for discharge.

In accordance with the present invention, an apparatus is provided for handling and dispensing stacks of articles, such as cups or containers, which are dispensed to associated filling equipment, ordinarily by discharge of the stacks to an associated denesting apparatus. Notably, the present apparatus includes an infeed conveyor which can be moved into a retracted position from beneath one or more associated stacks to discharge the stacks from the conveyor. One or more movable stack guides are provided to control and guide movement of stacks as they are conveyed and discharged from the apparatus.

As shown in the illustrated embodiment, the present apparatus for loading stacks of articles, comprises an infeed conveyor defining an upper run for carrying one or more stacks of the articles. The infeed conveyor includes an infeed end and a discharge end, with a conveyor drive provided for driving the infeed conveyor for advancing the stacks of articles in a direction from the infeed end to the discharge end.

The infeed conveyor includes a movable conveyor guide at the discharge end thereof, so that by reciprocable movement of the movable conveyor guide, the upper run of the conveyor can be changed between extended and retracted positions. As will described, this permits one of more stacks to be discharged from the conveyor for denesting and filling.

At least one stack gate is positioned at the discharge end of the infeed conveyor for controlling movement of the stacks of articles. Each stack gate is preferably rotatably movable about an axis generally with aligned the stacks of articles, and preferably has a generally semi-cylindrical configuration to conform to and stabilize each stack. Each stack gate is movable between a first open position, and a second blocking position. In the first open position of each stack gate, the movable conveyor guide can be positioned so that the upper run of said conveyor is in its extended position, and at least one of the stacks of articles can be conveyed along the upper run of the conveyor to the discharge end thereof.

Each stack gate can thereafter be moved to the second, blocking position to block advancement of the stacks of articles, while stabilizing the stacks. In this condition, the movable conveyor guide can thereafter be moved to change the upper run of the infeed conveyor from its extended position to its retracted position. This acts to move the upper run of the conveyor from beneath at least one endmost one of the stacks of articles, whereby at least one endmost stack of articles is downwardly discharged from the discharge end of the upper run of the infeed conveyor.

In a presently preferred embodiment, the present apparatus includes first and second ones of stack gates positioned in series, adjacent to each other at the discharge end of the upper run of the infeed conveyor. The first and second stack gates are thus provided at first and second endmost positions of the upper conveyor run. The first and second stack gates are independently positionable in each of the first open and second blocking positions thereof.

By this arrangement, the first stack gate can be positioned in the first open position thereof, and the second stack guide can be positioned in the second, blocking position thereof. With the stack guides in the relative orientation, one of the stacks of articles can be moved from the second endmost position to the first endmost position by operation of the infeed conveyor. At the same time, any further ones of the stacks are articles are prevented from moving into the second endmost position by the second stack guide being in its blocking position.

Precise operation is facilitated by providing the infeed conveyor with a movable idler guide which is movable in unison with the movable conveyor guide, to thereby maintain a substantially constant tension in said infeed conveyor.

A method of supplying stacks of articles to an associated apparatus in accordance with the present invention comprising the steps of providing an infeed conveyor defining an upper run for carrying one or more stacks of articles, including an infeed end and a discharge end, wherein the infeed conveyor is movable between extended and retracted positions. The present method further comprises providing at least one rotatable stack guide positioned at the discharge end of the infeed conveyor for controlling movement of the stacks of articles at the discharge end. The stack guide is rotatably movable between a first open position and a second blocking position.

During operation, the infeed conveyor is intermittently driven for advancing the stacks of articles in a direction from the infeed end to the discharge end. For handing the stacks of articles, the upper run the infeed conveyor is position in the extended position thereof, while positioning the stack guide in its open position. By this action, an endmost one of the stacks in moved to the discharge end of the upper run. Thereafter, by moving the stack guide from its open position to the blocking position, and by moving the upper run from its extended position to its retracted position, the upper run is moved from beneath the endmost one of said stacks to downwardly discharge the endmost stack from the upper run.

In the presently preferred practice, first and second ones of the stack guides are provided at respective first and second endmost positions of the upper run of infeed conveyor. The first and second stack guides are independently movable so that:

(1) when the upper run is in the extended condition, and the second stack guide is in the open position thereof, the conveyor is operated to move one of the stacks to the second endmost position;

(2) thereafter, the second stack guide is moved to its blocking position while the first stack guide is in its open position, with the conveyor operated to move the endmost one of said stacks from the second endmost position to the first endmost position of said upper run;

(3) thereafter moving the second stack guide from is blocking position to the open position thereof, and operating the conveyor to move the next endmost one of the stacks into the second endmost position of said upper run;

(4) positioning both of the first and second stack guides in the blocking positions thereof; and (5) moving the upper run of said infeed conveyor from the extended position thereof to the retracted position, so that the upper run is moved from beneath the stacks in the first and second endmost positions to downwardly discharge the stacks.

The present method further includes providing a movable conveyor idler, and moving the conveyor idler to maintain substantially constant tension in the conveyor as the upper run is moved between extended and retracted positions thereof.

Other features and advantages will become readily apparent from the following detailed description, the accompanying drawings, and the appended claims.

BRIEF DESCRIPTION OF THE DRAWINGS

FIGS. 3A and 3B are views similar to FIGS. 2A and 2B, showing stacks of articles after initial indexing movement thereof;

FIGS. 4A and 4B are views similar to FIGS. 3A and 3B, showing the second stack gate in its blocking position;

FIGS. 6A and 6B are views similar to FIGS. 5A and 5B, showing the second stack gate in its open position;

FIGS. 8A and 8B are views similar to FIGS. 7A and 7B, showing the first and second stack gates each in the blocking position.

DETAILED DESCRIPTION

Figure 1A:
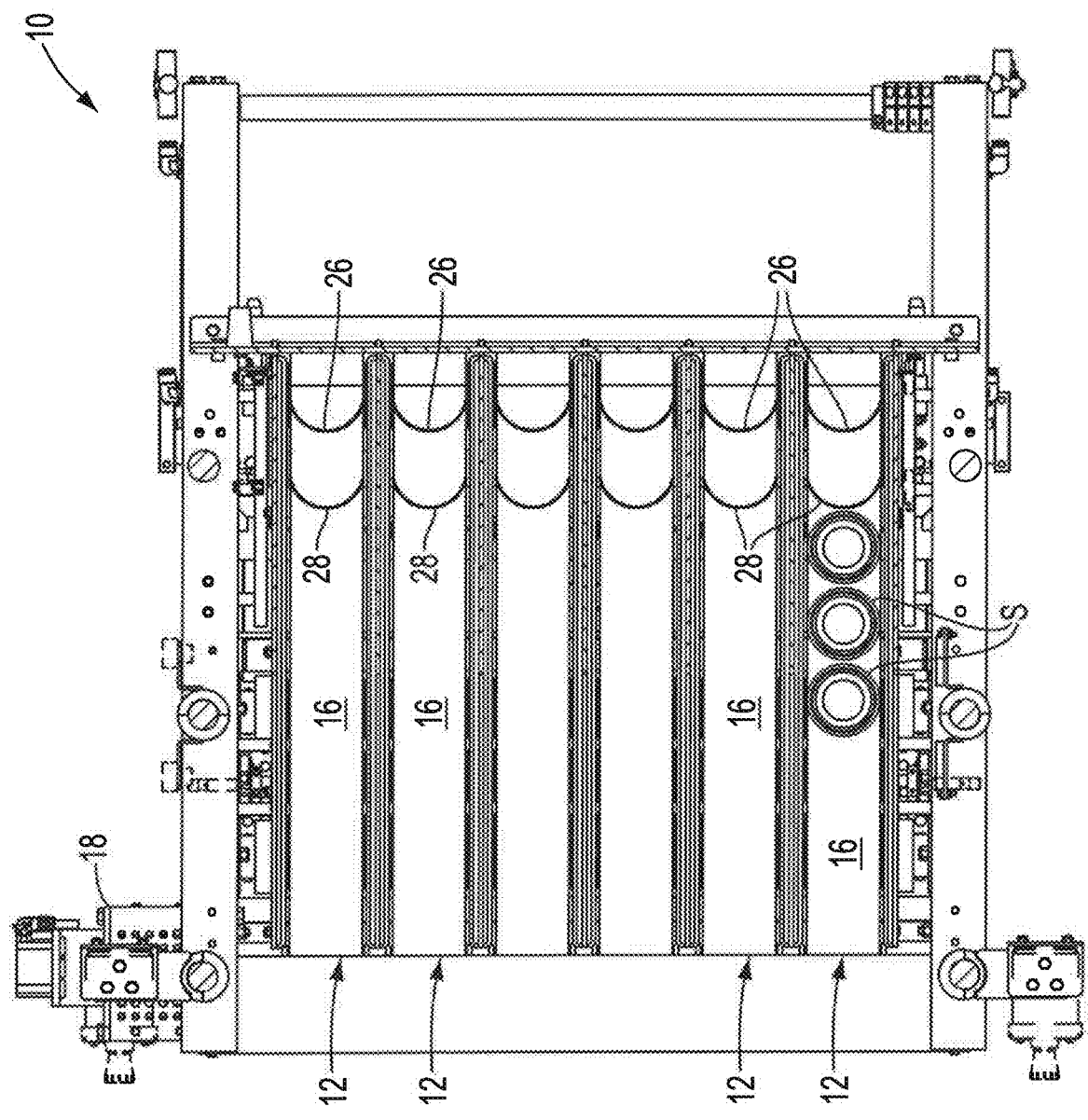
FIGS. 1A and 1B are, respectively, diagrammatic top plan and side elevational views of an apparatus for handling stacks for articles in accordance with the present invention, with stacks of articles in position prior to discharge from the apparatus.
Figure 1B:
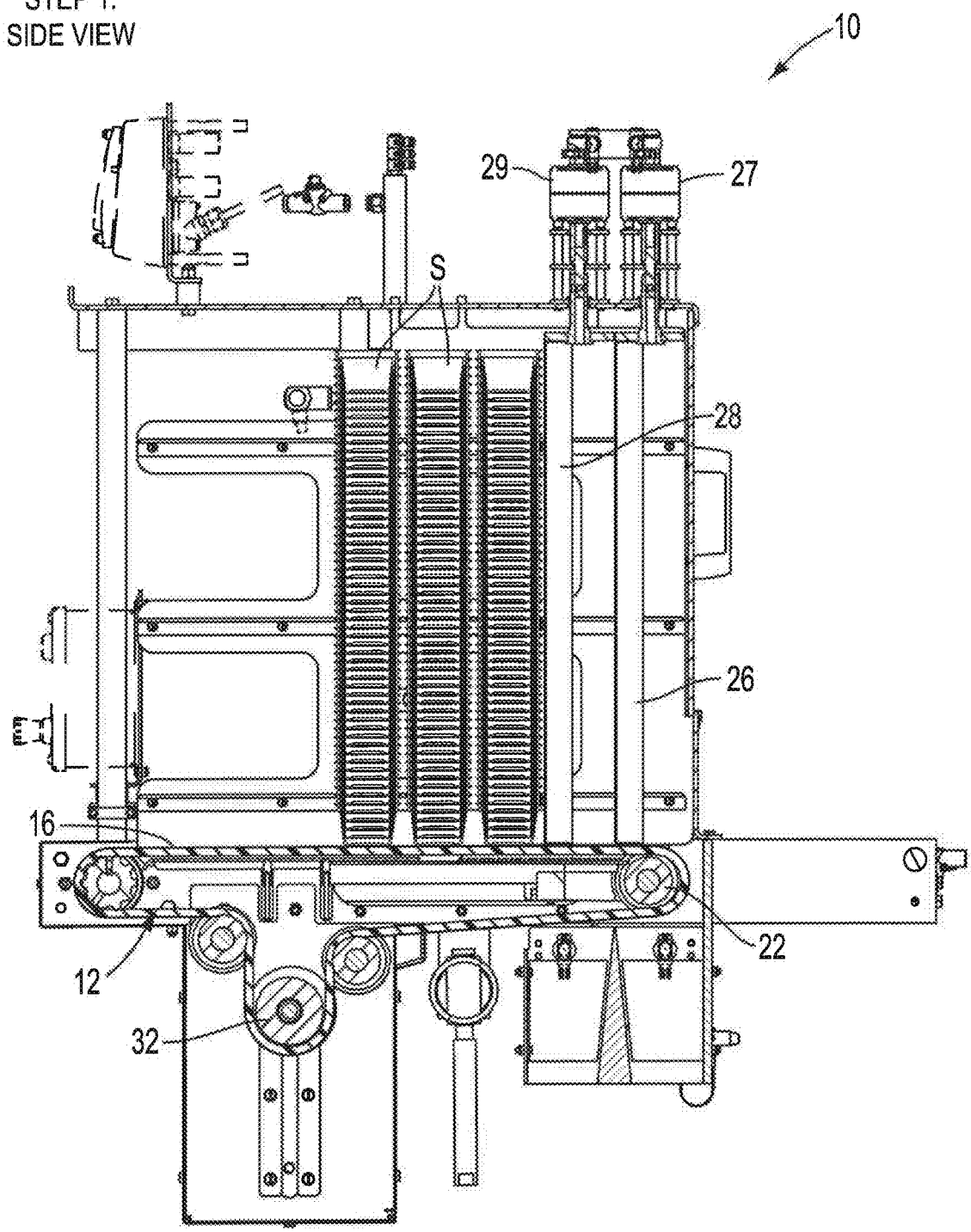

While the present invention is susceptible of embodiment in various forms, there is shown in the drawings, and will hereinafter be described, a presently preferred embodiment of the invention, with the understanding that the present disclosure is to be considered as an exemplification of the invention, and is not intended to limit the invention to the specific embodiment illustrated.

In accordance with the present invention, an apparatus 10 is provided for handling and dispensing stacks S of articles, such as cups or containers, which are dispensed to associated filling equipment, ordinarily by discharge of the stacks to an associated denesting apparatus.

Notably, the present apparatus 10 includes an infeed conveyor 12 which can be moved into a retracted position beneath one or more associated stacks S to discharge the stacks from the conveyor. One or more movable stack gates, designated 12, 14, as will be further described, are provided to control and guide movement of stacks S as they are conveyed and discharged from the apparatus.

An important aspect of the present apparatus 10 is its versality of operation, including operation which permits discharge of single stacks of cups, or two stacks at the same time. Denesters and other machines that are used downstream of the apparatus 10 may be configured to receive single stacks of cups, or two stacks. In the past, special devices have been required to supply machines which handle two stacks at a time, adding to the expense and complexity of the container-handling equipment. Significantly, because the present apparatus can be operated to supply either single or double stacks, the need for such specialized equipment is avoided. Analysis has shown this results in very significant cost savings, while enhancing reliable and consistent operation.

As shown in the illustrated embodiment, the present apparatus 10 comprises the infeed conveyor 12 defining an upper run 16 for carrying one or more stacks S of the articles. The infeed conveyor 12 includes an infeed end and a discharge end, with a conveyor drive 18 provided for driving the infeed conveyor, via conveyor guide 20, for advancing the stacks of articles in a direction from the infeed end to the discharge end (in a right-hand direction, referring to the orientation of the drawings).

The infeed conveyor 12 includes a movable conveyor guide 22 at the discharge end thereof, so that by reciprocable movement of the movable conveyor guide 22, the upper run 16 of the conveyor can be changed between extended and retracted positions. As will described, this permits one or more stacks S to be discharged from the conveyor for subsequent denesting and filling.

In accordance with the present invention, at least one movable stack gate is positioned at the discharge end of the infeed conveyor 12 for controlling movement of the stacks S of articles at the discharge end. In the illustrated embodiment, first and second movable stack gates 26 and 28 are provided for each of the lanes of the apparatus 10, whereby two stacks S of articles are discharged substantially simultaneously. However, it is within the purview of the present invention to provide a single stack gate for each lane, and operate the apparatus to discharge a single stack of the articles. In the preferred form, each of the stack gates has a generally semi-cylindrical configuration so that gate conform to and act to stabilize and control the stacks S.

Each stack gate 26, 28 is rotatably movable about an axis generally with aligned the stacks S of articles. Each stack gate is movable between a first open position (FIGS. 2A, 2B), and a second blocking position (FIGS. 3A, 3B). In the first open position of each stack gate 26, 28, the movable conveyor guide 22 can be positioned so that the upper run 16 of said conveyor 12 is in its extended position, and at least one of the stacks S of articles can be conveyed along the upper run 16 of the conveyor to the discharge end thereof.

Each stack gate can thereafter be moved to the second, blocking position to block advancement of the stacks of articles. In this condition, the movable conveyor guide 22 can thereafter be moved to change the upper run 16 of the infeed conveyor 12 from its extended position to to its retracted position. This acts to move the upper run of the conveyor 12 from beneath at least one endmost one of the stacks S of articles, whereby at least one endmost stack of articles is downwardly discharged from the discharge end of the upper run 16 of the infeed conveyor.

As noted, in a presently preferred embodiment, the present apparatus includes first and second ones of stack gates 26, 28, positioned in series adjacent to each other at the discharge end of the upper run 16 of the infeed conveyor 12. The first and second stack gates are thus provided at first and second endmost positions of the upper conveyor run 16, and permits two stacks of articles to be downwardly discharged together. As will be further described, the first and second stack gates 26, 28 are independently positionable in each of the first open and second blocking positions thereof.

By this arrangement, the first stack gate 26 can be positioned in the first open position thereof, and the second stack guide 28 can be positioned in the second blocking position thereof. With the stack guides in this relative orientation, one of the stacks of articles can be moved from the second endmost position to the first endmost position by operation of the infeed conveyor 12. At the same time, any further ones of the stacks S are articles are prevented from moving into the second endmost position by the second stack guide 28 being in its blocking position.

In the illustrated embodiment, the stack gates 26, 28 have been shown as being semi-cylindrical, and configured for rotational movement. This configuration promotes the desired guidance and stabilization of round cups or containers, and facilitates efficient drive of the gates. However, it should be understood that stack gates of other configurations can be employed, including stack gates which are otherwise shaped, which can be suitable for use with stacks of containers which arc differently shaped, such as generally square-shaped containers. While the stack gates 26, 28 are disclosed as being rotatably moveable, the gates can be configured to be otherwise movable, such as by pivotal or linear movement.

Precise operation is facilitated by providing the infeed conveyor with a movable idler guide 32 which is movable in unison with the movable conveyor guide 22, to thereby maintain a substantially constant tension in said infeed conveyor 12.

The method operating the present apparatus 10 will now be described. As noted, the illustrated arrangement, including first and second stack gate that operate in concert with each other permits two of the stacks S to be discharged at the same time to the associated denesting.

The present method first comprises providing the infeed conveyor 12 which defines the upper run 16 for carrying one or more stacks S of articles. The conveyor includes the infeed end and the discharge end, with the upper run 16 of the infeed conveyor being movable between extended and retracted positions.

The present method further comprises providing at least one of the rotatable stack gates 26, 28 positioned at the discharge end of the infeed conveyor 12 for controlling movement of the stacks of articles at the discharge end. The stack gates are each preferably rotatably movable between a first open position and a second blocking position.

During operation, the infeed conveyor 16 is intermittently driven for advancing the stacks S of articles in a direction from the infeed end to the discharge end. For handing the stacks S of articles, the upper run 16 of the infeed conveyor is positioned in the extended position thereof. With a single one of the stack gates, the gate is positioned in its open position. By this action, an endmost one of the stacks can be moved to the discharge end of the upper run. Thereafter, by moving the stack gate from its open position to the blocking position, and by moving the upper run 16 from its extended position to its retracted position, the upper run is moved from beneath the endmost one of said stacks S to downwardly discharge the endmost stack from the upper run. As seen in FIG. 4A, in this embodiment the stack gates pivot through approximately 180° between the open and blocking positions. As also seen in FIG. 4A, the opposite sides that cooperate with the stacks of articles have substantially the same shape.

Figure 2A:
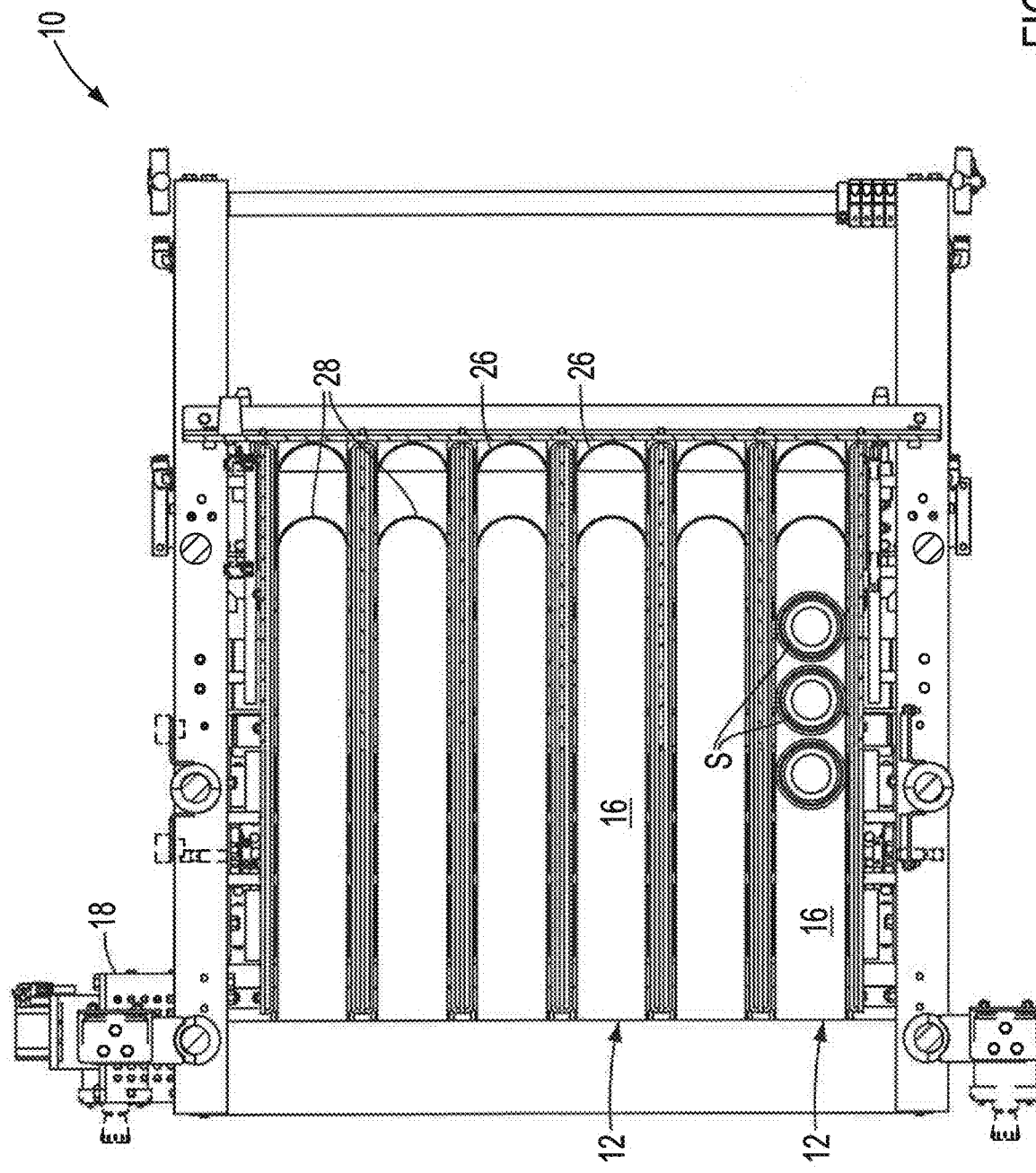
FIGS. 2A and 2B are views similar to FIGS. 1A and 1B, showing first and second stack gates of the present apparatus prior to indexing movement of the stacks of articles, with a conveyor of the apparatus in its extended position.
Figure 2B:
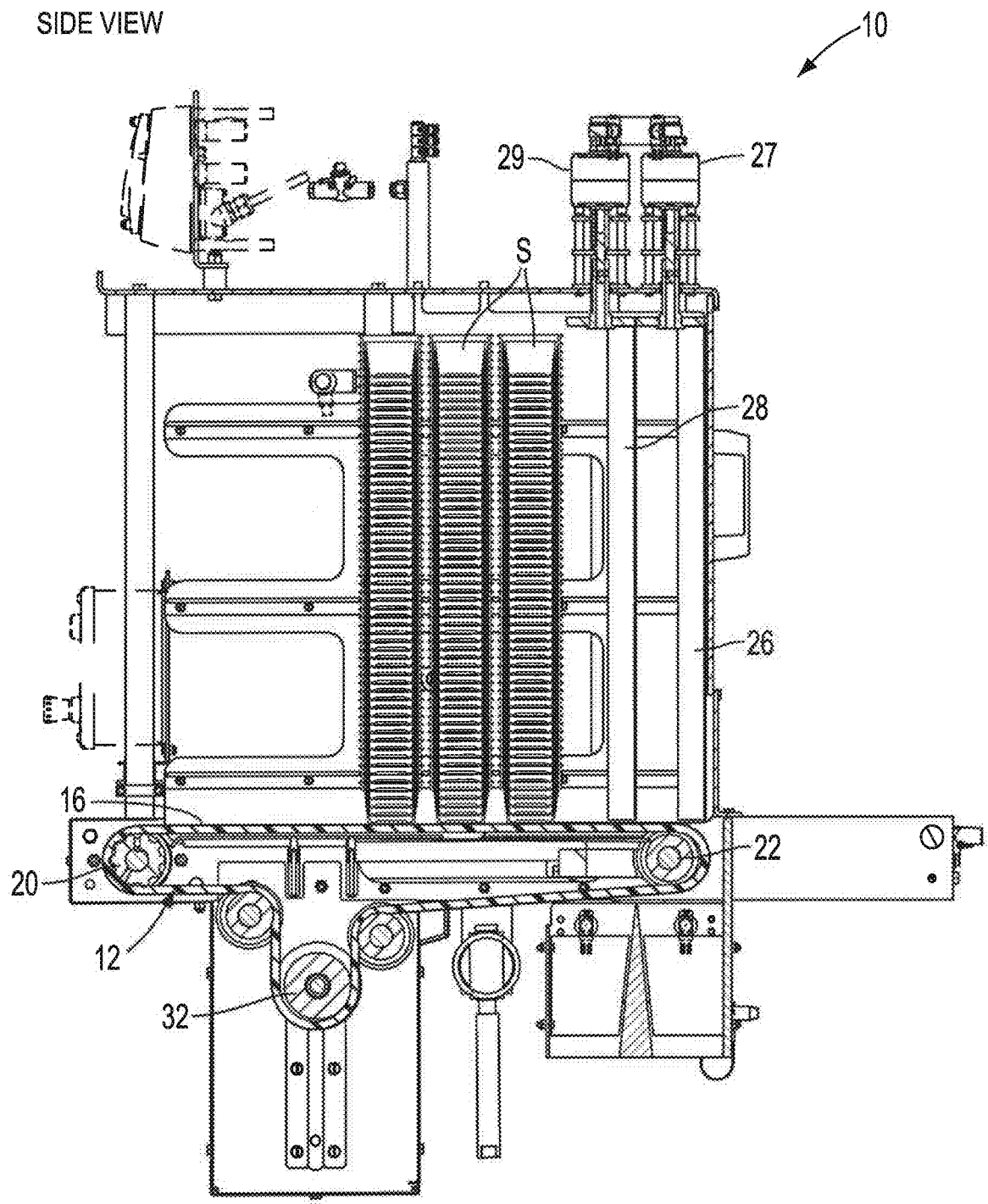
Figure 3B:
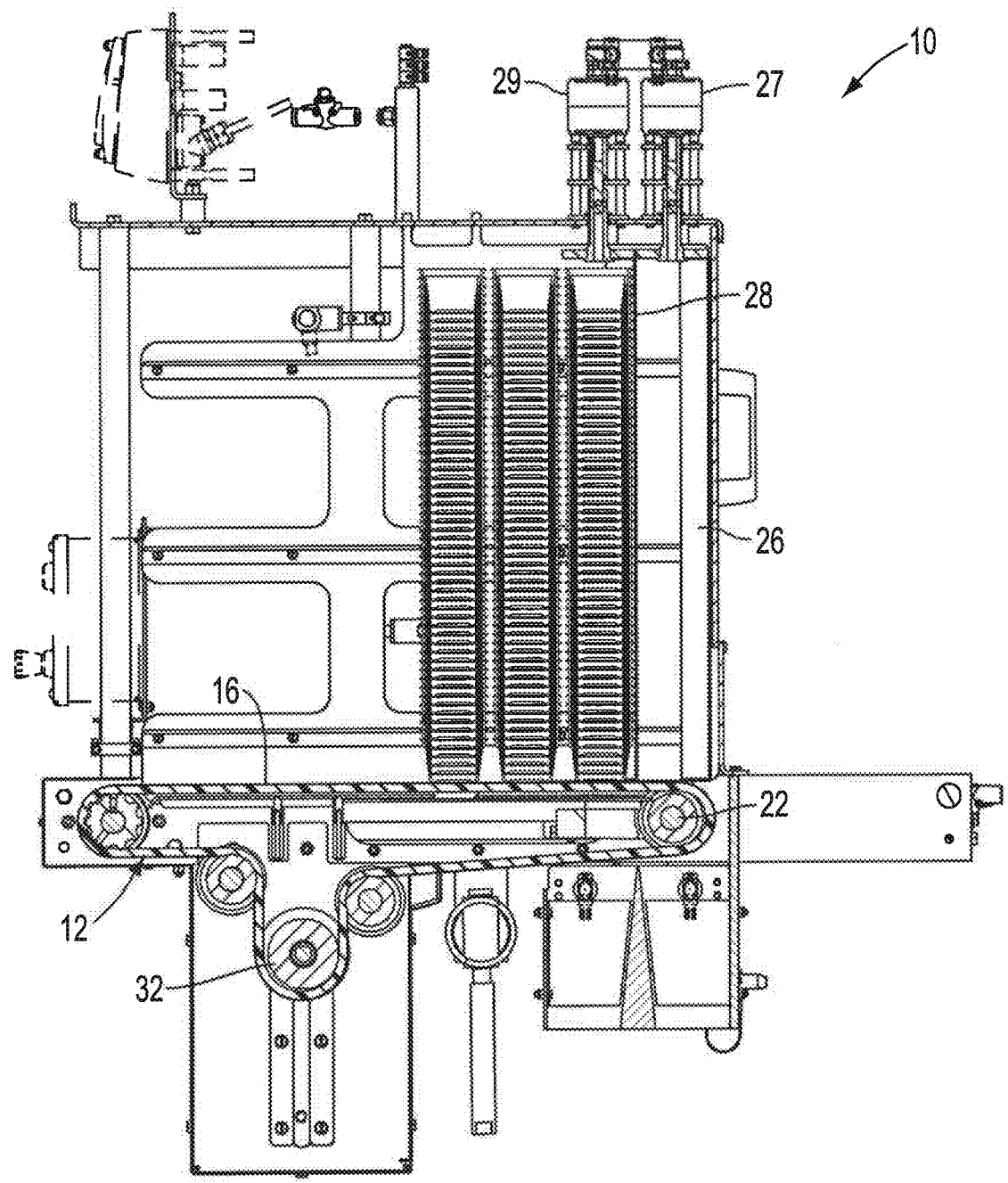
Figure 4B:
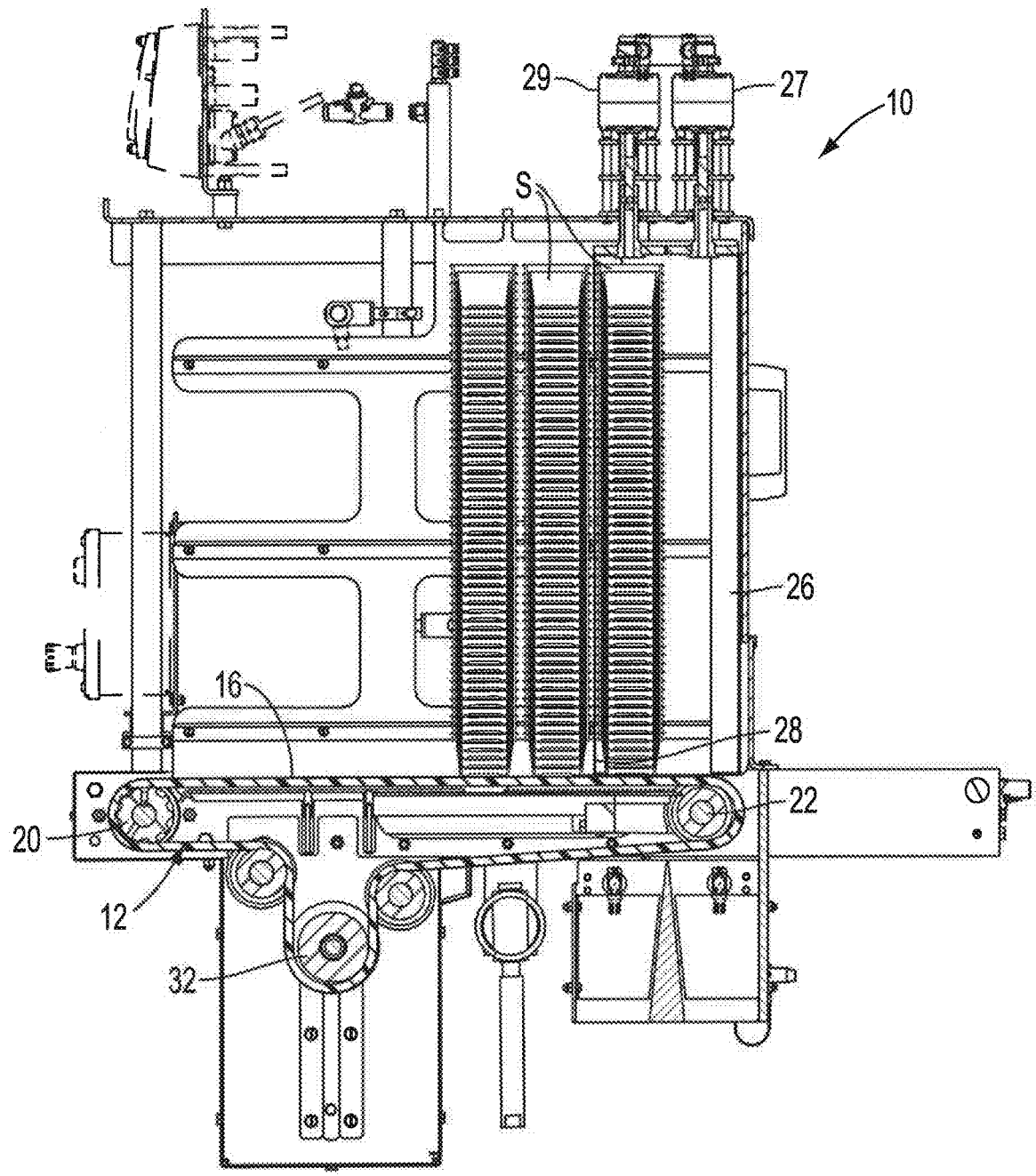
Figure 5A:
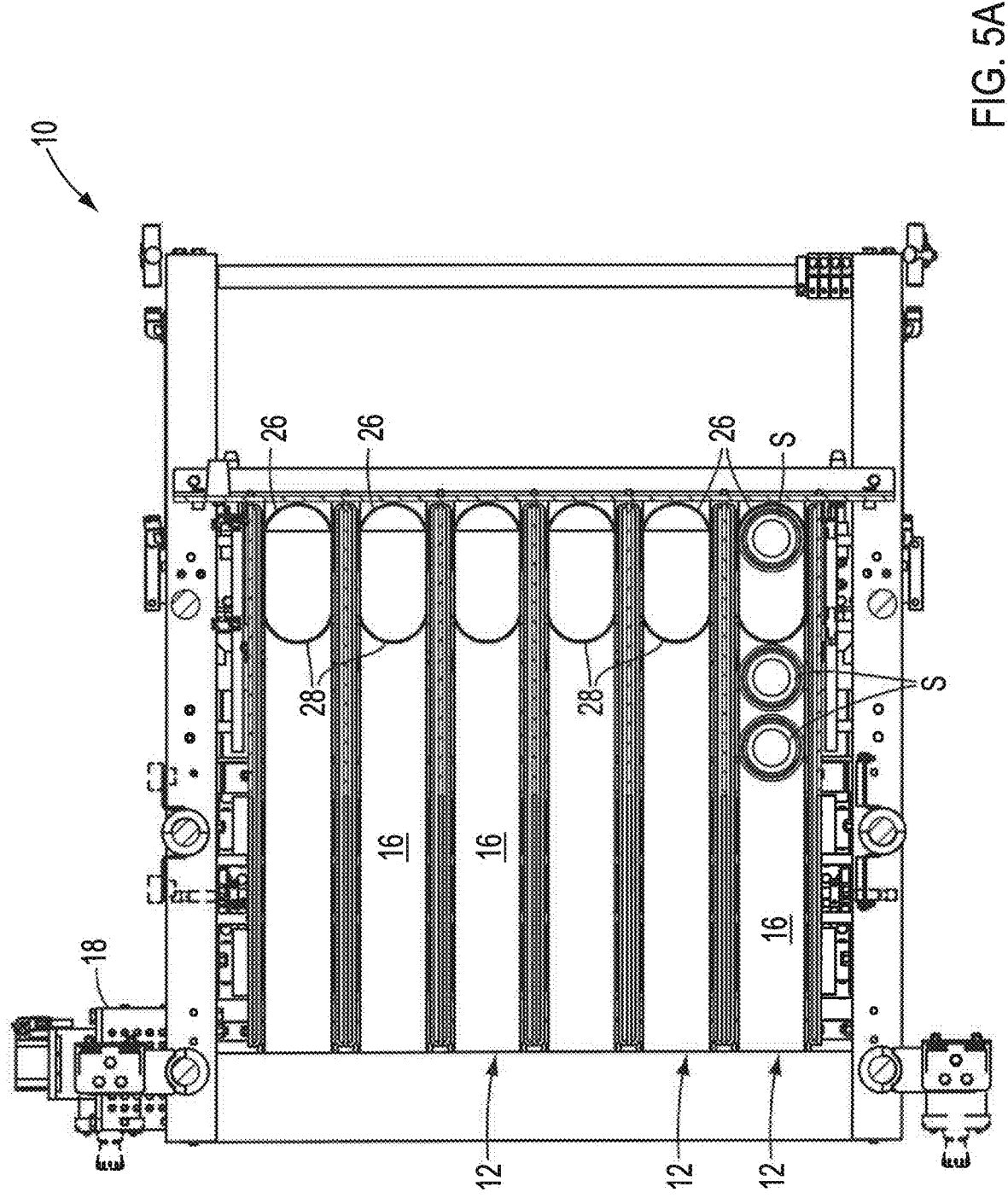
FIGS. 5A and 5B are views similar to FIGS. 4A and 4B, showing movement of an endmost one of the stacks of articles.
Figure 5B:
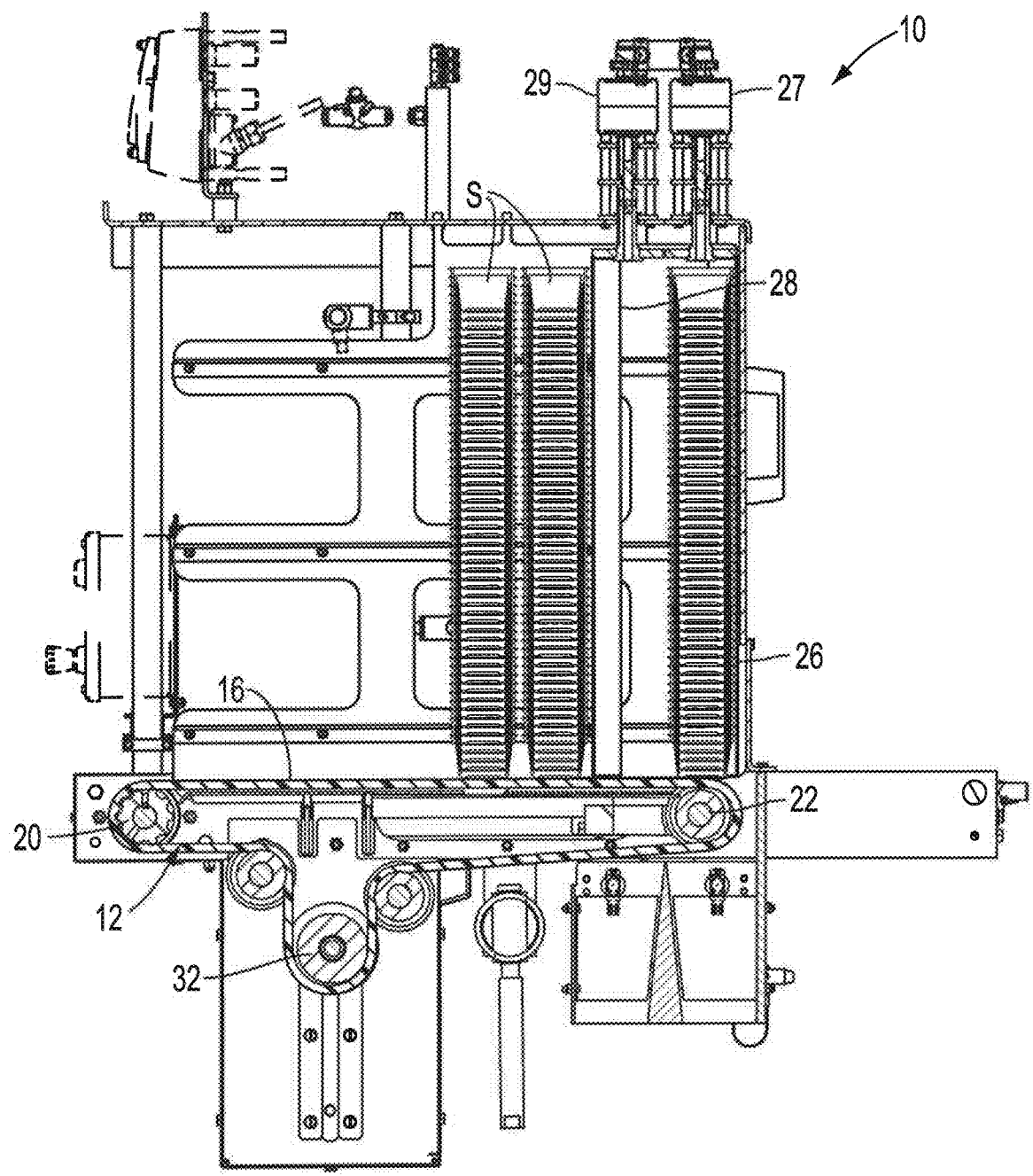
Figure 6B:
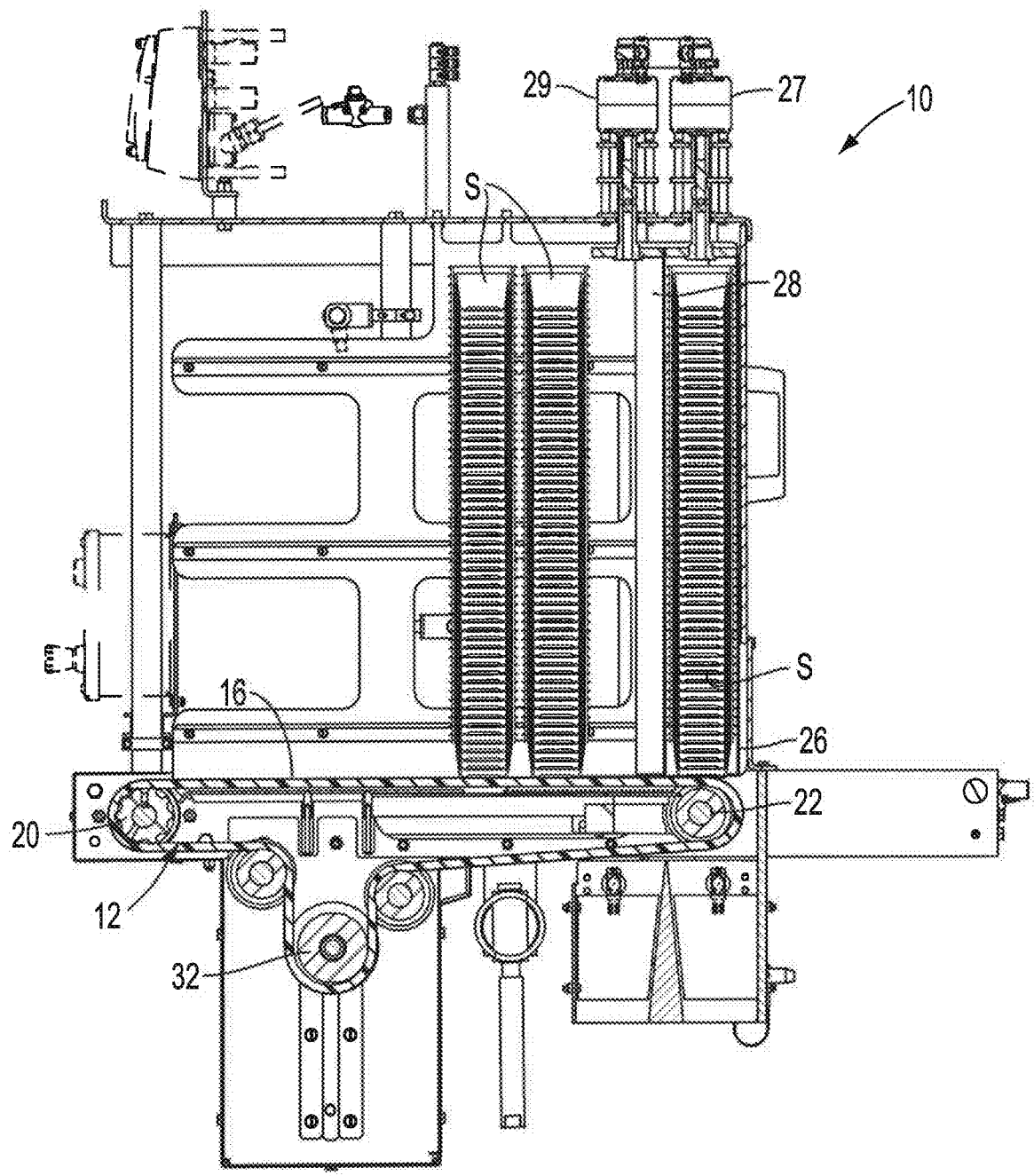
Figure 7A:
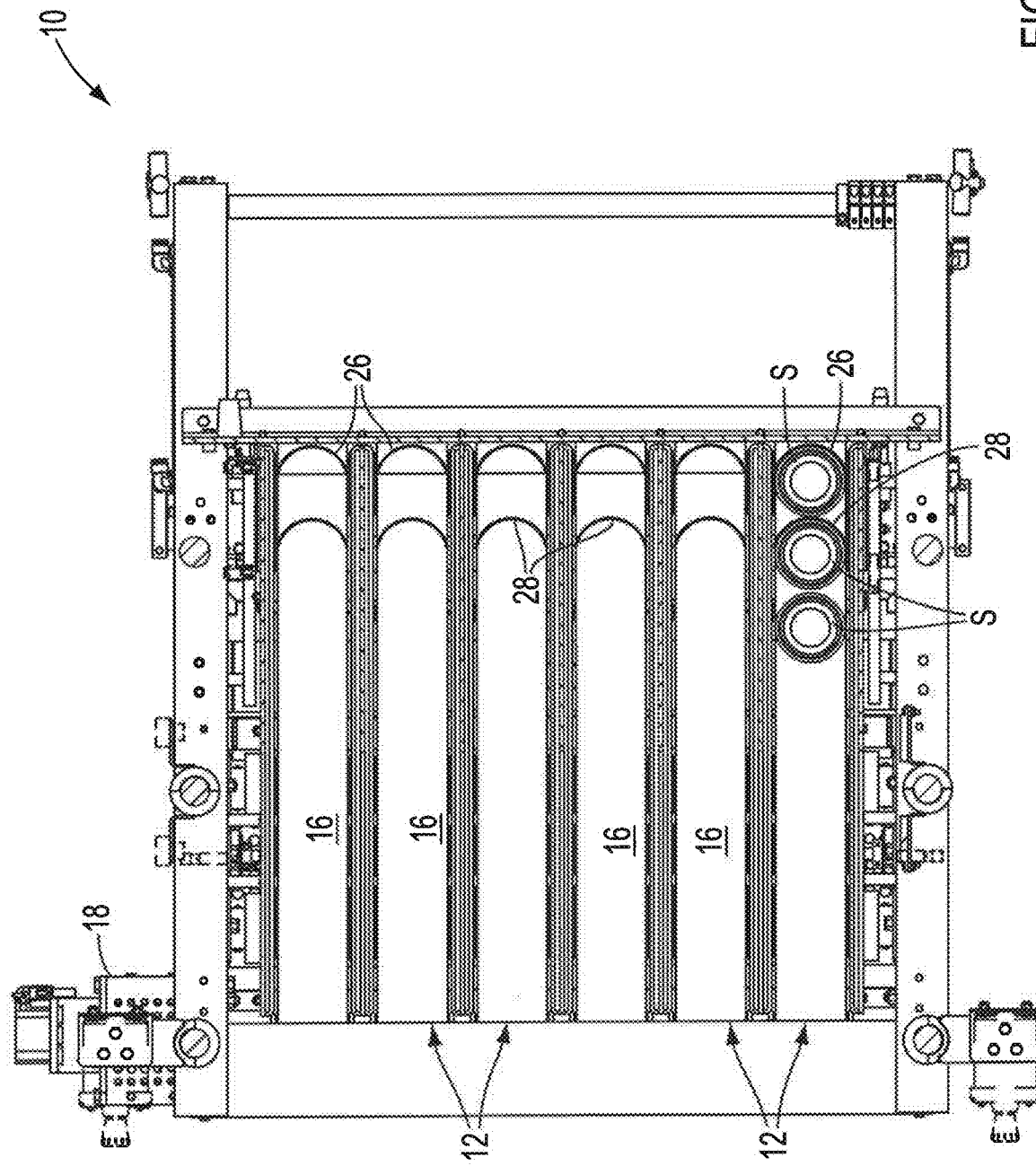
FIGS. 7A and 7B are views similar to FIGS. 6A and 6B, showing further indexing movement of the stacks of articles.
Figure 7B:
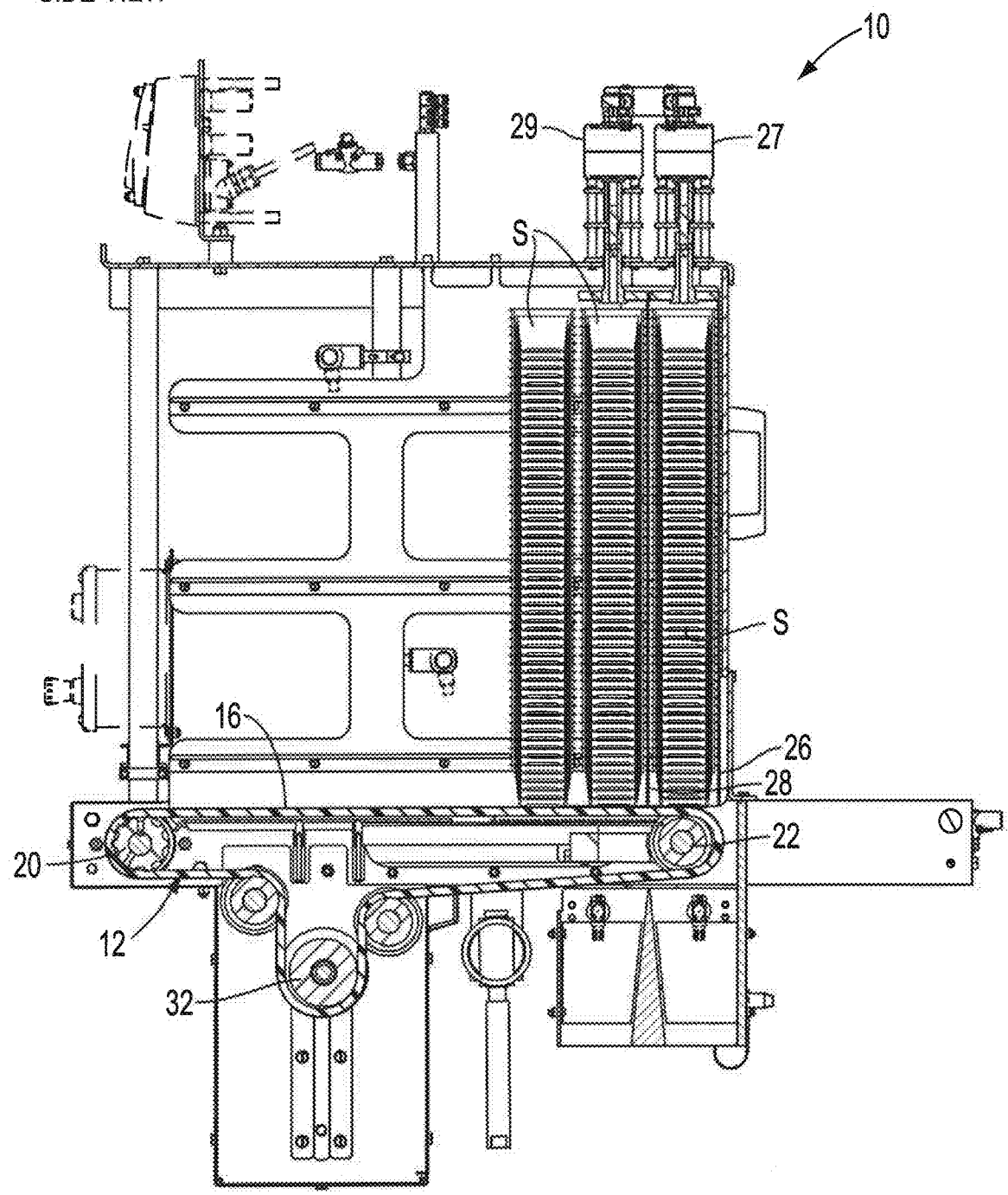
Figure 8B:
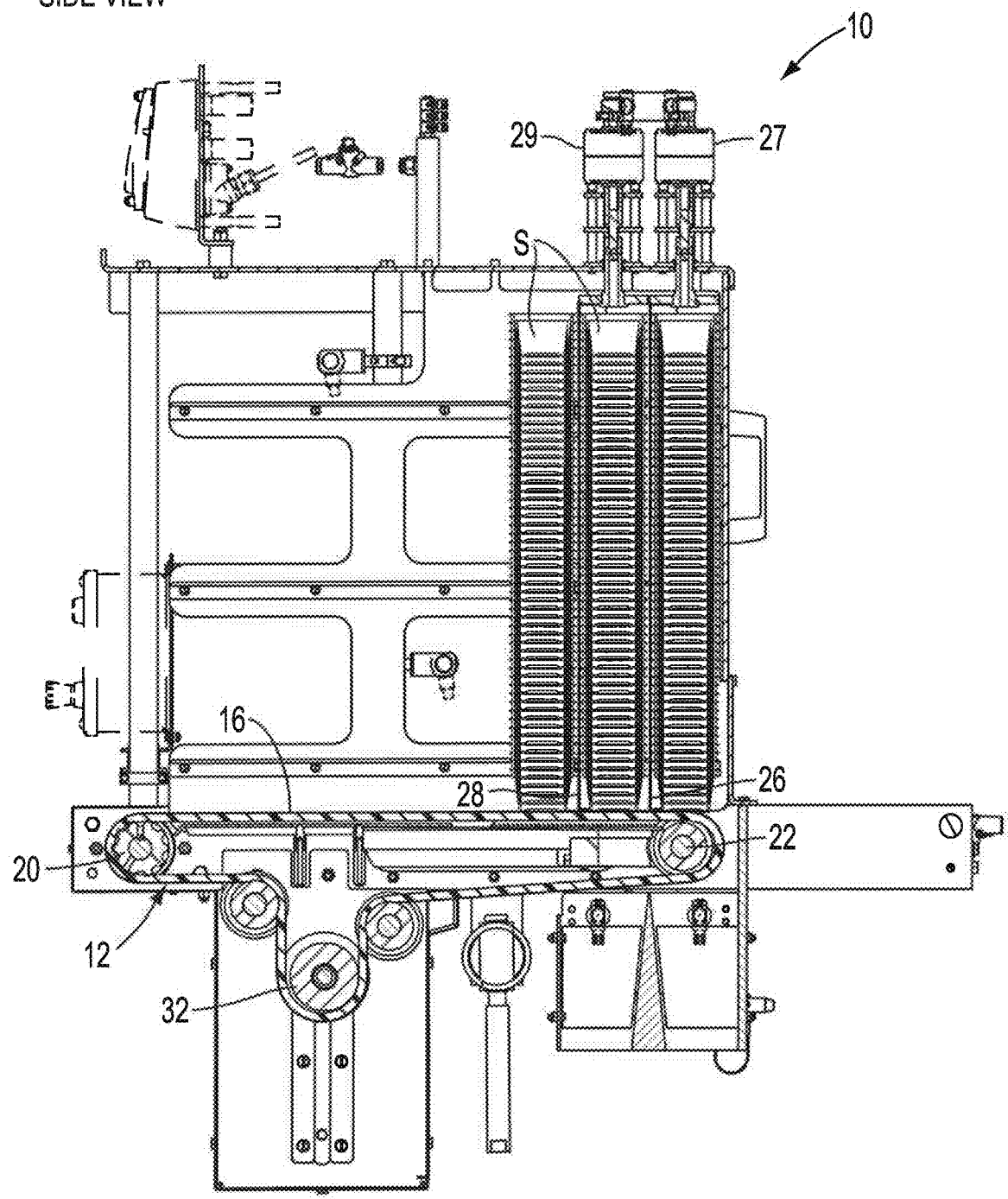
Figure 9A:
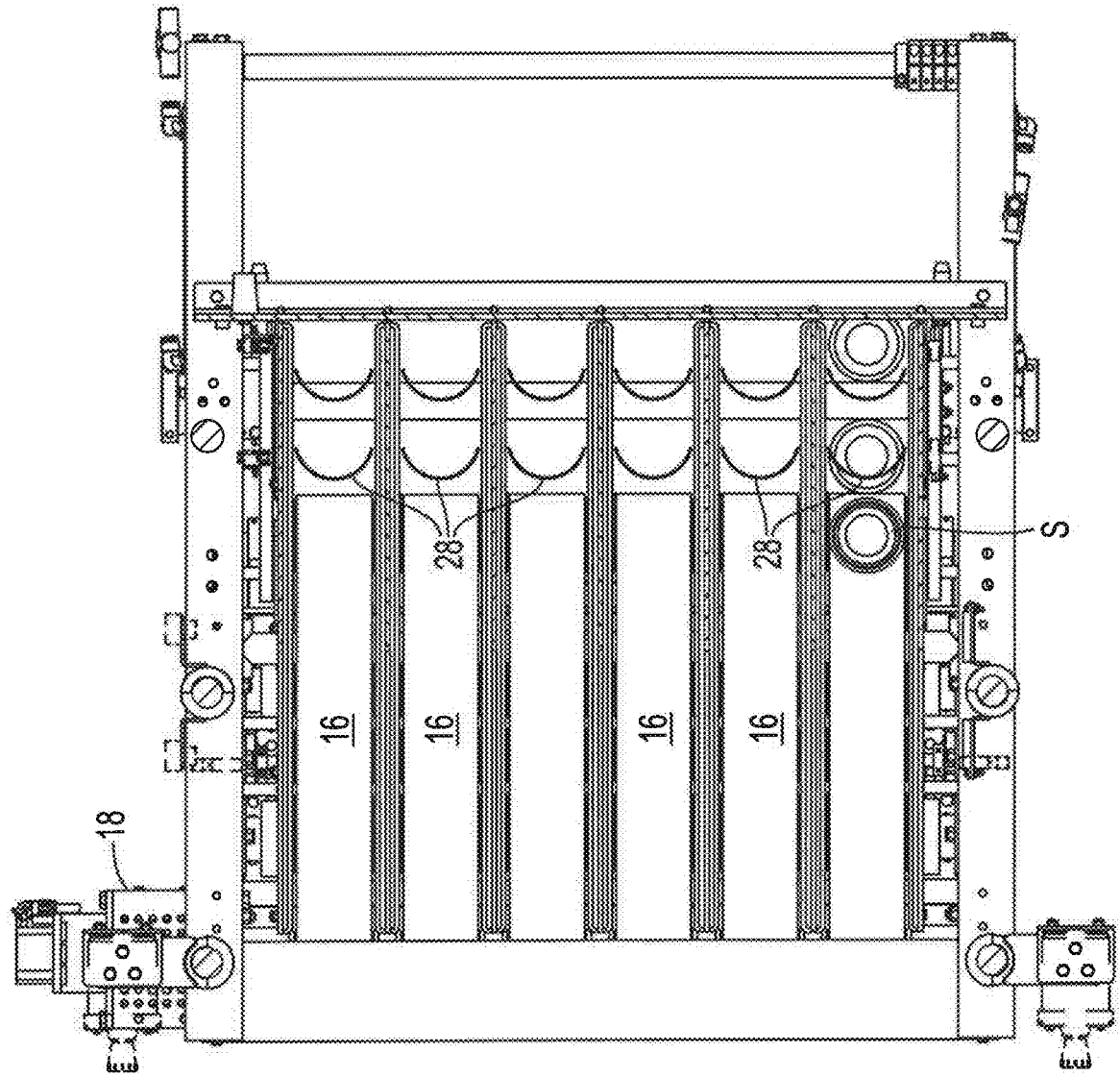
FIGS. 9A and 9B are views similar to FIGS. 8A and 8B, showing movement of the conveyor of the apparatus to a retracted position for discharge of two stacks of articles from the apparatus.
Figure 9B:
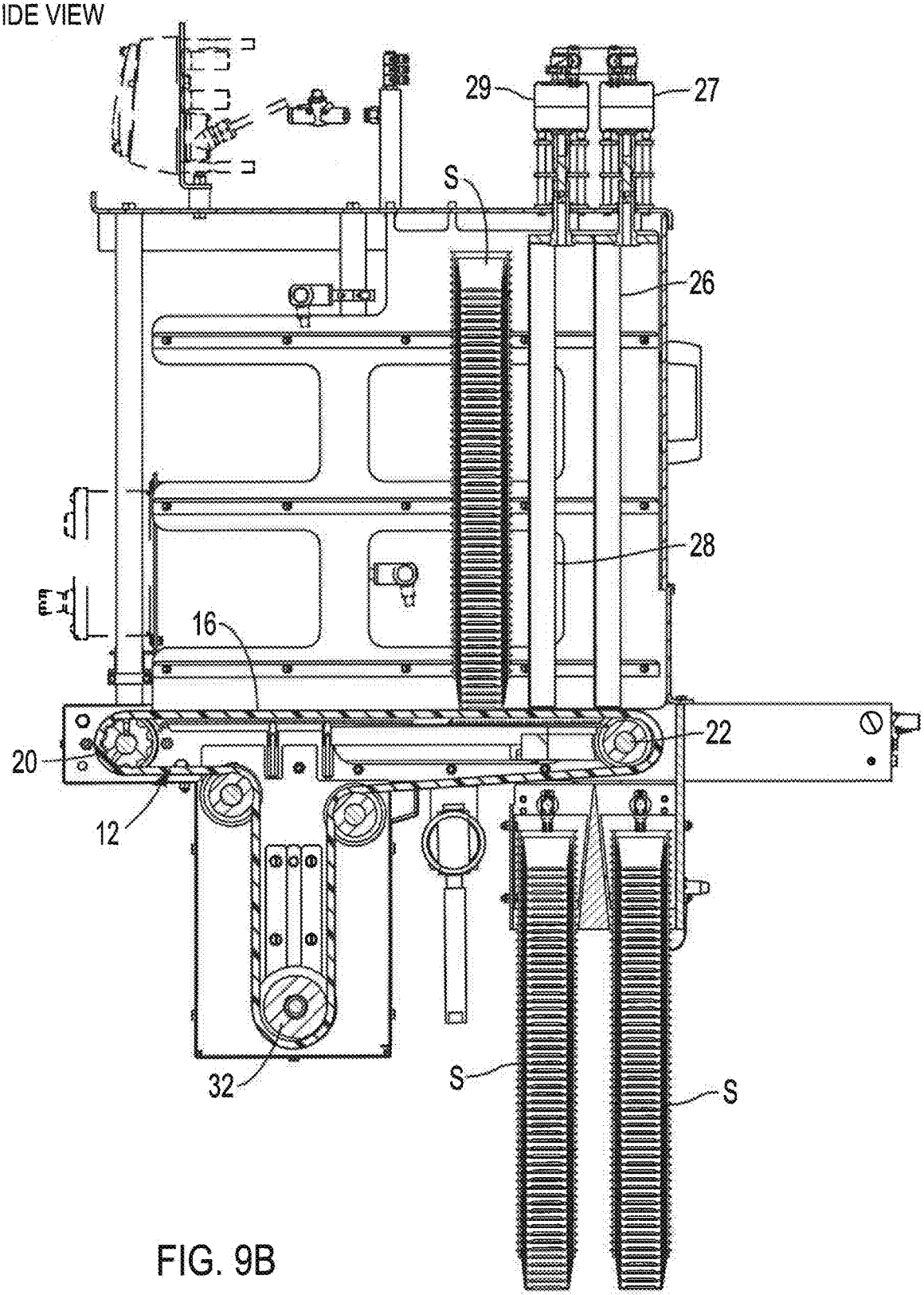

In the presently preferred practice, first and second ones of the stack gates are provided at respective first and second endmost positions of the upper run 16 of infeed conveyor 12. The first and second stack gates are independently movable so that:

(1) when the upper run 16 is in the extended condition, and the second stack gate 28 is in the open position thereof, the conveyor 12 is operated to move one of the stacks S to the second endmost position (see FIGS. 2A, 2B; FIGS. 3A, 3B);

(2) thereafter, the second stack gate 28 is moved to its blocking position, while the first stack gate is in its open position, with the conveyor 12 operated to move the endmost one of said stacks S from the second endmost position to the first endmost position of the upper run 16 (see FIGS. 4A, 4B; FIGS. 5A, 5B);

(3) thereafter moving the second stack gate 28 from is blocking position to the open position thereof, and operating the conveyor 12 to move the next endmost one of the stacks S into the second endmost position of the upper run 16 (see FIGS. 6A, 6B; FIGS. 7A, 7B);

(4) positioning both of the first and second stack gates in 26, 28 in the blocking positions thereof (see FIGS. 8A, 8B); and (5) moving the upper run 16 of said infeed conveyor 12, by movement of movable guide 22, from the extended position thereof to the retracted position, so that the upper run 16 is moved from beneath the stacks S in the first and second endmost positions to downwardly discharge the stacks (FIGS. 9A, 9B).

As will observed from FIGS. 9A, 9B, the movable conveyor idler 32 is moved in unison with movable conveyor guide 22 to maintain substantially constant tension in the conveyor 12 as the upper run 16 is moved between extended and retracted positions thereof.

From the foregoing, it will be observed numerous modifications and variations can be effected without departing from the true spirit and scope of the novel concept of the present invention. It is to be understood that no limitations with respect to the specific embodiment disclosed herein are intended or should be inferred. The disclosure is intended to cover, by the appended claims, all such modifications as fall within the scope of the claims.

What is claimed is:

1. An apparatus for loading stacks of articles, comprising:
an infeed conveyor defining an upper run for carrying one or more stacks of articles, said infeed conveyor including an infeed end and a discharge end;
a conveyor drive for driving said infeed conveyor for advancing said stacks of articles in a direction from said infeed end to said discharge end;
said infeed conveyor including a movable conveyor guide, so that by reciprocable movement of said movable conveyor guide, said upper run of said conveyor can be changed between extended and retracted positions; and
at least one stack gate, the at least one stack gate comprising a first stack gate with opposite sides positioned at said discharge end of said infeed conveyor at a first location for controlling movement of said stacks of articles carried on the upper run at said discharge end, said first stack gate at the first location being movable between a first open position and a second blocking position,
wherein in said first open position of said first stack gate at the first location, said movable conveyor guide is positioned so that said upper run of said conveyor is in said extended position, and at least one of said stacks of articles can be conveyed along said upper run of said infeed conveyor in a first direction in a first conveying path to said discharge end thereof and to against one of the opposite sides of said first stack gate at the first location,
said first stack gate at the first location thereafter being movable to said second, blocking position wherein the other of the opposite sides of said first stack gate at the first location intercepts, and thereby blocks conveyance along said upper run of additional of said stacks of articles in said first direction in the first conveying path, said movable conveyor guide thereafter being movable to change said upper run of said infeed conveyor from said extended position to said retracted position, to thereby move said upper run of said infeed conveyor from beneath at least the one of said stacks of articles, whereby the at least one of said stacks of articles is downwardly discharged from said discharge end of said upper run of said infeed conveyor,
wherein the first stack gate pivots through approximately 180° between said first and second positions.

2. An apparatus for loading stacks of articles in accordance with claim 1, wherein
the first stack gate projects above the upper run of said conveyor in both said first and second positions.

3. An apparatus for loading stacks of articles in accordance with claim 1, wherein
said infeed conveyor includes a movable idler guide which is movable in unison with said movable conveyor guide to maintain a substantially constant tension in said infeed conveyor.

4. An apparatus for loading stacks of articles comprising:
an infeed conveyor defining an upper run for carrying one or more stacks of articles, said infeed conveyor including an infeed end and a discharge end;
a conveyor drive for driving said infeed conveyor for advancing said stacks of articles in a direction from said infeed end to said discharge end;
said infeed conveyor including a movable conveyor guide at the discharge end thereof, so that by reciprocable movement of said movable conveyor guide, said upper run of said conveyor can be changed between extended and retracted positions; and
at least one stack gate, the at least one stack gate comprising a first stack gate positioned at said discharge end of said infeed conveyor for controlling movement of said stacks of articles at said discharge end, said first stack gate being movable between a first open position and a second blocking position,
wherein in said first open position of said first stack gate, said movable conveyor guide is positioned so that said upper run of said conveyor is in said extended position, and at least one of said stacks of articles can be conveyed along said upper run of said infeed conveyor in a first direction to said discharge end thereof and to against said first stack gate, said first stack gate thereafter being movable to said second, blocking position to block conveyance along said upper run of additional of said stacks of articles in said first direction, said movable conveyor guide thereafter being movable to change said upper run of said infeed conveyor from said extended position to said retracted position, to thereby move said upper run of said infeed conveyor from beneath at least the one of said stacks of articles, whereby the at least one of said stacks of articles is downwardly discharged from said discharge end of said upper run of said infeed conveyor, wherein said first stack gate pivots between said first and second positions, wherein said first stack gate has a generally semi-cylindrical configuration.

5. An apparatus for loading stacks of articles comprising:

an infeed conveyor defining an upper run for carrying one or more stacks of articles, said infeed conveyor including an infeed end and a discharge end;

a conveyor drive for driving said infeed conveyor for advancing said stacks of articles in a direction from said infeed end to said discharge end;

said infeed conveyor including a movable conveyor guide at the discharge end thereof, so that by reciprocable movement of said movable conveyor guide, said upper run of said conveyor can be changed between extended and retracted positions; and at least one stack gate, the at least one stack gate comprising a first stack gate positioned at said discharge end of said infeed conveyor for controlling movement of said stacks of articles at said discharge end, said first stack gate being movable between a first open position and a second blocking position, wherein in said first open position of said first stack gate, said movable conveyor guide is positioned so that said upper run of said conveyor is in said extended position, and at least one of said stacks of articles can be conveyed along said upper run of said infeed conveyor in a first direction to said discharge end thereof and to against said first stack gate, said first stack gate thereafter being movable to said second, blocking position to block conveyance along said upper run of additional of said stacks of articles in said first direction, said movable conveyor guide thereafter being movable to change said upper run of said infeed conveyor from said extended position to said retracted position, to thereby move said upper run of said infeed conveyor from beneath at least the one of said stacks of articles, whereby the at least one of said stacks of articles is downwardly discharged from said discharge end of said upper run of said infeed conveyor, wherein the at least one stack gate comprises a second stack gate, the first and second stack gates positioned adjacent to each other at said discharge end of said upper run of said infeed conveyor at first and second endmost positions of said upper run, said first and second stack gates being independently positionable in each of said first open and second blocking positions, whereby said first stack gate can be positioned in said first open position thereof, and said second stack gate can be positioned in said second, blocking position thereof, so that one of said stacks of articles can be moved from said second endmost position to said first endmost position by operation of said infeed conveyor, while any further ones of said stacks are articles are prevented from moving into said second endmost position by said second stack gate being in its blocking position.

6. A method of supplying stacks of articles to an associated apparatus, comprising the steps of:

providing an infeed conveyor defining an upper run for carrying one or more stacks of articles, including an infeed end and a discharge end, said infeed conveyor being movable between extended and retracted positions;

providing at least one movable stack gate, the at least one movable stack gate comprising a first movable stack gate positioned at a first location at said discharge end of said infeed conveyor for controlling movement of said stacks of articles carried on the upper run at said discharge end, said first movable stack gate being movable between a first open position and a second blocking position at the first location, the step of providing at least one movable stack gate comprising providing a second stack gate upstream of the first stack gate movable between a first open position and a second blocking position, intermittently driving said infeed conveyor for advancing said stacks of articles carried on the upper in a first direction in a first conveying path from said infeed end to said discharge end;

with said upper run of said infeed conveyor in said extended position, coordinating driving of the infeed conveyor and movement of the first and second movable stack gates to place an endmost one of the stacks of articles and a second endmost one of the stacks of articles at the discharge end, and blocking the endmost and second endmost ones of the stacks of articles, one each with the first and second movable stack gates while moving said upper run of said infeed conveyor from said extended position to said retracted position, so that said upper run is moved from beneath both said endmost and second endmost ones of said stacks to downwardly discharge both said endmost and second endmost ones of said stacks from said upper run.

7. A method of supplying stacks of articles to an associated apparatus in accordance with claim 6, including:

pivoting said first movable stack gate between said first and second positions, wherein the first stack gate projects above the upper run of the conveyor in both the first and second positions.

8. A method of supplying stacks of articles to an associated apparatus in accordance with claim 6, including:

providing a movable conveyor idler, and moving said conveyor idler to maintain substantially constant tension in said conveyor as said upper run is moved between extended and retracted positions thereof.

9. A method of supplying stacks of articles to an associated apparatus comprising the steps of:

providing an infeed conveyor defining an upper run for carrying one or more stacks of articles, including an infeed end and a discharge end, said infeed conveyor being movable between extended and retracted positions;

providing at least one movable stack gate, the at least one movable stack gate comprising a first movable stack gate positioned at said discharge end of said infeed conveyor for controlling movement of said stacks of articles at said discharge end, said first movable stack gate being movable between a first open position and a second blocking position, intermittently driving said infeed conveyor for advancing said stacks of articles in a direction from said infeed end to said discharge end;

positioning said upper run of said infeed conveyor in said extended position, and positioning said first movable stack gate in said open position, so that an endmost one of said stacks is moved to the discharge end of said upper run to against said first movable stack gate, thereafter moving said first movable stack gate from said open position to said blocking position, moving said upper run of said upper run infeed conveyor from said extended position to said retracted position, so that said upper run is moved from beneath said endmost one of said stacks to downwardly discharge said endmost stack from said upper run, providing a second movable stack gate, the first and second movable stack gates at respective first and second endmost positions of said upper run of said infeed conveyor, independently moving said first and second movable stack gates so that:

(1) when said upper run is in said extended condition, and said second movable stack gate is in the open position thereof, said conveyor is operated to move one of said stacks to said second endmost position;

(2) thereafter, said movable second stack gate is moved to its blocking position while said first movable stack gate is in its open position, with said conveyor operated to move said endmost one of said stacks from said second endmost position to said first endmost position of said upper run;

(3) moving said second movable stack gate from the blocking position to the open position thereof, and operating said conveyor to move the next endmost one of said stacks into said second endmost position of said upper run;

(4) positioning both of said first and second movable stack gates into the blocking positions thereof; and (5) moving said upper run of said infeed conveyor from said extended position thereof to said retracted position, so that said upper run is moved from beneath said stacks in said first and second endmost positions to downwardly discharge said stacks.

10. A method of supplying stacks of articles to an associated apparatus in accordance with claim 9, including:

pivoting said first and second movable stack gates to change the first and second movable stack gates between said first and second position.

11. An apparatus for loading stacks of articles, comprising:

an infeed conveyor defining an upper run for carrying one or more stacks of articles, said infeed conveyor including an infeed end and a discharge end;

a conveyor drive for driving said infeed conveyor for advancing said stacks of articles carried on the upper run in a direction from said infeed end to said discharge end;

said infeed conveyor including a movable conveyor guide so that by reciprocable movement of said movable conveyor guide, said upper run of said conveyor can be changed between extended and retracted positions; and at least one stack gate, the at least one stack gate comprising a first stack gate positioned at said discharge end of said infeed conveyor at a first location for controlling movement of said stacks of articles carried on the upper run at said discharge end, said first stack gate at the first location being movable between a first open position and a second blocking position, wherein in said first open position of said first stack gate at the first location, said movable conveyor guide is positioned so that said upper run of said conveyor is in said extended position, and at least one of said stacks of articles can be conveyed along said upper run of said infeed conveyor in a first direction in a first conveying path to said discharge end thereof and to against said first stack gate at the first location, said first stack gate at the first location thereafter being movable to said second, blocking position wherein the first stack gate at the first location intercepts, and thereby blocks conveyance along said upper run of additional of said stacks of articles in said first direction in the first conveying path, said movable conveyor guide thereafter being movable to change said upper run of said infeed conveyor from said extended position to said retracted position, to thereby move said upper run of said infeed conveyor from beneath at least the one of said stacks of articles, whereby the at least one of said stacks of articles is downwardly discharged from said discharge end of said upper run of said infeed conveyor, wherein the at least one stack gate comprises a second stack gate spaced fully upstream of the first stack gate for controlling movement of said stacks of articles carried on the upper run at the discharge end, the second stack gate movable between a first open position and a second blocking position corresponding respectively to the first and second blocking positions for the first stack gate, the apparatus configured so that the first and second stack gates can be moved in a coordinated manner together with the infeed conveyor to place the at least one of said stacks of articles and a second stack of articles at the same time at the discharge end of said upper run of said infeed conveyor whereupon changing the upper run of said infeed conveyor from said extended position to said retracted position causes the upper run of said infeed conveyor to move from beneath the at least one of said stacks of articles and the second stack of articles whereupon the at least one of said stacks of articles and the second stack of articles downwardly discharge from the discharge end of said upper run of said infeed conveyor.

12. An apparatus for loading stacks of articles, comprising:

an infeed conveyor defining an upper run for carrying one or more stacks of articles, said infeed conveyor including an infeed end and a discharge end;

a conveyor drive for driving said infeed conveyor for advancing said stacks of articles in a direction from said infeed end to said discharge end;

said infeed conveyor including a movable conveyor guide, so that by reciprocable movement of said movable conveyor guide, said upper run of said conveyor can be changed between extended and retracted positions; and at least one stack gate, the at least one stack gate comprising a first stack gate with opposite sides positioned at said discharge end of said infeed conveyor at a first location for controlling movement of said stacks of articles carried on the upper run at said discharge end, said first stack gate at the first location being movable between a first open position and a second blocking position, wherein in said first open position of said first stack gate at the first location, said movable conveyor guide is positioned so that said upper run of said conveyor is in said extended position, and at least one of said stacks of articles can be conveyed along said upper run of said infeed conveyor in a first direction in a first conveying path to said discharge end thereof and to against one of the opposite sides of said first stack gate at the first location, said first stack gate at the first location thereafter being movable to said second, blocking position wherein the other of the opposite sides of said first stack gate at the first location intercepts, and thereby blocks conveyance along said upper run of additional of said stacks of articles in said first direction in the first conveying path, said movable conveyor guide thereafter being movable to change said upper run of said infeed conveyor from said extended position to said retracted position, to thereby move said upper run of said infeed conveyor from beneath at least the one of said stacks of articles, whereby the at least one of said stacks of articles is downwardly discharged from said discharge end of said upper run of said infeed conveyor, wherein the opposite sides have a substantially same shape where the stacks of articles engage the opposite sides when the apparatus is operated.

\* \* \* \* \*